US009396525B2

(12) United States Patent
Shaburova et al.

(10) Patent No.: US 9,396,525 B2
(45) Date of Patent: Jul. 19, 2016

(54) METHOD FOR REAL TIME VIDEO PROCESSING INVOLVING CHANGING A COLOR OF AN OBJECT ON A HUMAN FACE IN A VIDEO

(71) Applicant: Avatar Merger Sub II, LLC., Minneapolis, MN (US)

(72) Inventors: Elena Shaburova, Castro Valley, CA (US); Yuri Monastyrshin, Chervonij Hutor (UA)

(73) Assignee: Avatar Merger Sub II, LLC, Minneapolis, MN (US)

( * ) Notice: Subject to any disclaimer, the term of this patent is extended or adjusted under 35 U.S.C. 154(b) by 0 days.

(21) Appl. No.: 14/325,477

(22) Filed: Jul. 8, 2014

(65) Prior Publication Data
US 2015/0221069 A1    Aug. 6, 2015

Related U.S. Application Data

(60) Provisional application No. 61/936,016, filed on Feb. 5, 2014.

(51) Int. Cl.
*G06K 9/00* (2006.01)
*G06T 5/00* (2006.01)
(Continued)

(52) U.S. Cl.
CPC ............... *G06T 5/005* (2013.01); *G06F 3/011* (2013.01); *G06K 9/00261* (2013.01); *G06K 9/00281* (2013.01); *G06K 9/00302* (2013.01); *G06K 9/00711* (2013.01); *G06K 9/46* (2013.01); *G06K 9/52* (2013.01); *G06N 99/005* (2013.01); *G06T 7/0046* (2013.01); *G06T 7/2046* (2013.01); *G06T 11/001* (2013.01); *G06T 13/40* (2013.01); *G06T 17/20* (2013.01); *G06T 19/20* (2013.01); *G11B 27/031* (2013.01); *H04N 5/262* (2013.01); *G06K 2009/4666* (2013.01); *G06T 2207/10016* (2013.01); *G06T 2207/10021* (2013.01); *G06T 2207/10024* (2013.01); *G06T 2207/20036* (2013.01); *G06T 2207/30201* (2013.01)

(58) Field of Classification Search
None
See application file for complete search history.

(56) References Cited

U.S. PATENT DOCUMENTS 5,479,603 A    12/1995    Stone et al.
6,621,939 B1    9/2003    Negishi et al.
(Continued)

OTHER PUBLICATIONS

Dornaika, F., Davoine, F.: On appearance based face and facial action tracking. IEEE Trans. Circuits Syst. Video Technol. 16(9), Sep. 2006: p. 1107-1124).

(Continued)

*Primary Examiner* — Feng Niu
(74) *Attorney, Agent, or Firm* — Schwegman Lundberg & Woessner, P.A.

(57) ABSTRACT

A computer-implemented method for real time video processing for changing a color of an object in a video is presented. The method is performed in connection with a computerized system comprising a processing unit and a memory. The method comprises providing an object in the video that at least partially and at least occasionally is presented in frames of the video; detecting the object in the video; tracking the detected object in the video; generating a set of node points on the created mesh based on a request for changing color, the set of node points defining an area the color of which is to be changed; and transforming the frames of the video in such way that the object's color is changed within the defined area when the object is presented in frames of the video.

24 Claims, 7 Drawing Sheets

(51) Int. Cl.

| | | |
|---|---|---|
| *G06T 11/00* | (2006.01) | |
| *G06T 7/00* | (2006.01) | |
| *G06T 13/40* | (2011.01) | |
| *G06T 17/20* | (2006.01) | |
| *G06T 19/20* | (2011.01) | |
| *G06F 3/01* | (2006.01) | |
| *G06N 99/00* | (2010.01) | |
| *G11B 27/031* | (2006.01) | |
| *H04N 5/262* | (2006.01) | |
| *G06K 9/46* | (2006.01) | |
| *G06K 9/52* | (2006.01) | |
| *G06T 7/20* | (2006.01) | |

(56) References Cited

U.S. PATENT DOCUMENTS

| | | | |
|---|---|---|---|
| 7,119,817 | B1 | 10/2006 | Kawakami |
| 8,230,355 | B1 * | 7/2012 | Bauermeister ........ G06F 3/0481 715/765 |
| 2004/0119662 | A1 | 6/2004 | Dempski |
| 2005/0180612 | A1 | 8/2005 | Nagahashi et al. |
| 2005/0202440 | A1 * | 9/2005 | Fletterick ............. G01N 33/743 435/6.16 |
| 2006/0170937 | A1 | 8/2006 | Takahashi |
| 2006/0227997 | A1 | 10/2006 | Au et al. |
| 2007/0268312 | A1 | 11/2007 | Marks et al. |
| 2012/0144325 | A1 | 6/2012 | Mital et al. |
| 2012/0167146 | A1 | 6/2012 | Incorvia |
| 2012/0306853 | A1 * | 12/2012 | Wright .................... G06T 19/20 345/419 |
| 2013/0208129 | A1 | 8/2013 | Stenman |
| 2014/0043329 | A1 | 2/2014 | Wang et al. |
| 2015/0195491 | A1 * | 7/2015 | Shaburov ................. H04N 7/15 348/14.12 |
| 2015/0221118 | A1 * | 8/2015 | Shaburova .............. G06T 5/005 345/423 |
| 2015/0221136 | A1 * | 8/2015 | Shaburova .............. G06T 5/005 345/419 |
| 2015/0221338 | A1 | 8/2015 | Shaburova et al. |
| 2015/0222821 | A1 * | 8/2015 | Shaburova .............. G06T 5/005 348/571 |

OTHER PUBLICATIONS http://www.imatest.com.

U.S. Appl. No. 14/314,312, Non Final Office Action mailed Nov. 5, 2015, 26 pgs.

U.S. Appl. No. 14/314,324, Non Final Office Action mailed Nov. 5, 2015, 23 pgs.

U.S. Appl. No. 14/314,334, Non Final Office Action mailed Nov. 13, 2015, 39 pgs.

U.S. Appl. No. 14/314,343, Non Final Office Action mailed Nov. 4, 2015, 14 pgs.

John, Wiley, et al., "Digital Image Processing: Principles and Applications", Baxes, (1994), 88-91.

* cited by examiner

METHOD FOR REAL TIME VIDEO PROCESSING INVOLVING CHANGING A COLOR OF AN OBJECT ON A HUMAN FACE IN A VIDEO

CROSS-REFERENCE TO RELATED APPLICATIONS

This application claims the benefit of U.S. Provisional Application No. 61/936,016, filed on Feb. 5, 2014.

BACKGROUND OF THE INVENTION

1. Technical Field

The disclosed embodiments relate generally to the field of real time video processing and, in particular, to a computerized system and computer-implemented method for real time video processing that involves changing color of an object on a face in a video.

2. Description of the Related Art

Nowadays a variety of programs can provide processing of still images, for example, effects like face thinning, makeup, etc, and processing of real time video using some filters (for example, web cam video). There are also known face tracking algorithms and implementations for videos.

U.S. Patent Application Publication No. US2007268312, incorporated herein by reference, discloses a method of replacing face elements by some components that is made by users for real time video. However, it is not possible to process real time video in such a way that an object shown in real time video can be modified in real time naturally with some effects. In case of a human's face, such effects can include making a face younger/older, applying makeup, removing pigments stains, bruises, blemishes, scars and etc.

On the IMATEST software website (http://www.imatest.com/) an algorithm for detecting blemishes on a photo is disclosed. According to the developers of IMATEST, the method includes forming linearized picture and detecting so-called pixel error according to average pixel intensity over an area and a prescribed threshold. Though the disclosed algorithm is alike the present invention, it does not allow video processing, and even being applied to a sequence of images (video frames) it would not work efficiently due to successive heavy operations associated with the image preparatory processing for blemish detection. Thus, there is need for a method providing effective and naturally looking blemish detecting and removing.

Thus, new and improved systems and methods are needed that would enable real time video processing that involves changing color of an object on a face of a user in a video.

SUMMARY OF THE INVENTION

The embodiments described herein are directed to systems and methods that substantially obviate one or more of the above and other problems associated with the conventional technology for real time video processing.

In accordance with one aspect of the embodiments described herein, there is provided a computer-implemented method for real time processing of a video for changing a color of an object in the video, the method being performed in connection with a computerized system comprising a processing unit and a memory, the method comprising: providing an object in the video that at least partially and at least occasionally is presented in frames of the video; detecting the object in the video, wherein said detection comprises detecting feature reference points of the object; tracking the detected object in the video, wherein the tracking comprises creating a mesh that is based on the detected feature reference points of the object and aligning the mesh to the object in each frame; generating a set of node points on the created mesh based on a request for changing color, the set of node points defining an area the color of which is to be changed; and transforming the frames of the video in such way that the object's color is changed within the defined area when the object is presented in frames of the video.

In accordance with another aspect of the embodiments described herein, there is provided a computer-implemented method of real time processing of a video for changing color of an object on a face in the video, the method being performed in connection with a computerized system comprising a processing unit and a memory, the method comprising: forming a mesh of the face in the video based on distinguishable points present in most frames of the video; aligning the mesh to the face image in each frame; forming a binary mask providing the pixels to be recolored based on a weighted sum of information from the current frame and information from at least one previous frame; aligning the binary mask to the mesh on each frame; and applying a new colour and a new intensity value to the pixels of each frame that are to be recolored.

In one or more embodiments, the new colour is applied without full intensity so that the colour is partly opaque.

In one or more embodiments, the new colour and intensity value for the pixels of each frame that are to be recolored are calculated using color and intensity values of a neighbor pixel.

In one or more embodiments, aligning the binary mask to the mesh on each frame comprises: making a projection of a mesh to a regular grid to separate the mesh into 100×100 cells by the regular grid; determining the mesh element to which a cell of the grid corresponds to, for each cell; and determining the pixel corresponding to each of the determined mesh elements.

In one or more embodiments, determining the pixel corresponding to each of the determined mesh elements is performed using a breadth-first-search.

In one or more embodiments, making a projection of a mesh to the grid is performed once and steps of determining the mesh element and determining the pixel corresponding to each of the determined mesh elements are performed for each frame.

In one or more embodiments, forming a binary mask providing the pixels to be recolored comprises: dividing the mesh into at least 1600 cells by a grid; scanning each frame by a square pixel region, wherein the size of the square pixel region in pixels is determined from the width of an eye in pixels; determining the mean gray-value intensity of each scanned square of the frame; detecting pixels to be recolored by comparing the gray-value intensity of each pixel with the mean value of the square it belongs to and by marking the pixels that have the intensity at least 0.92 times of the mean intensity value as pixels to be recolored; removing a region from the mesh around the pixels to be recolored, wherein the region is a circle having a center on a pixel marked as a pixel to be recolored and a radius as a linear function of the eye width; applying binary morphological closing to the plurality of marked pixels, wherein the binary morphological closing comprises morphological dilation and morphological erosion applied with a radius determined from the width of eye in pixels; and removing small and large regions of the pixels to be recolored from the mesh, wherein the regions with an area less than $R^2*0.2$ are detected as small and the regions with an area more than $R^2*8$ are detected as large, wherein R is the radius of binary morphological operations and each region is a four-connected component.

In one or more embodiments, removing small and large regions of the pixels to be recolored is performed using breadth-first-search.

In accordance with yet another aspect of the embodiments described herein, there is provided a mobile computerized system comprising a processing unit and a memory, the memory storing instructions for: forming a mesh of the face in a video based on distinguishable points present in most frames of the video; aligning the mesh to the face image in each frame; forming a binary mask providing the pixels to be recolored based on a weighted sum of information from the current frame and information from at least one previous frame; aligning the binary mask to the mesh on each frame; and applying a new colour and a new intensity value to the pixels of each frame that are to be recolored.

In one or more embodiments, the new colour is applied without full intensity so that the colour is partly opaque.

In one or more embodiments, the new colour and intensity value for the pixels of each frame that are to be recolored are calculated using color and intensity values of the neighbor pixel.

In one or more embodiments, forming a mask for each frame by aligning the mask to the mesh on each frame comprises the following steps: making a projection of a mesh to a regular grid to separate the mesh into 100×100 cells by the regular grid; determining the mesh element to which a cell of the grid corresponds to, for each cell; and determining the pixel corresponding to each of the determined mesh elements.

In one or more embodiments, determining the pixel corresponding to each of the determined mesh elements is performed using a breadth-first-search.

In one or more embodiments, making a projection of a mesh to the grid is performed once and steps of determining the mesh element and determining the pixel corresponding to each of the determined mesh elements are performed for each frame.

In one or more embodiments, forming a binary mask providing the pixels to be recolored comprises the following steps: dividing the mesh into at least 1600 cells by a grid; scanning each of the frames by a square pixel region, wherein the size of the square pixel region in pixels is determined from the width of an eye in pixels; determining the mean gray-value intensity of each scanned square of the frame; detecting pixels to be recolored by comparing the gray-value intensity of each pixel with the mean value of the square it belongs to and by marking the pixels that have the intensity at least 0.92 times of the mean intensity value as pixels to be recolored; removing a region from the mesh around the pixels to be recolored, wherein the region is a circle having a center on a pixel marked as a pixel to be recolored and a radius as a linear function of the eye width; applying a binary morphological closing to the plurality of marked pixels, wherein the binary morphological closing comprises morphological dilation and morphological erosion applied with a radius determined from the width of eye in pixels; removing small and large regions of the pixels to be recolored from the mesh, wherein the regions with an area less than $R^2*0.2$ are detected as small and the regions with an area more than $R^2*8$ are detected as large, wherein R is radius of binary morphological operations and each region is a four-connected component.

In one or more embodiments, removing small and large regions of the pixels to be recolored is performed using breadth-first-search.

In accordance with yet another aspect of the embodiments described herein, there is provided a device capable of video processing comprising a processing unit and a memory, the memory storing instructions for: forming a mesh of the face in a video based on distinguishable points present in most frames of the video; aligning the mesh to the face image in each frame; forming a binary mask providing the pixels to be recolored based on a weighted sum of information from the current frame and information from at least one previous frame; aligning the binary mask to the mesh on each frame; and applying a new colour and a new intensity value to the pixels of each frame that are to be recolored.

In one or more embodiments, the new colour is applied without full intensity so that the colour is partly opaque.

In one or more embodiments, the new colour and intensity value for the pixels of each frame that are to be recolored are calculated using color and intensity values of the neighbor pixel.

In one or more embodiments, forming a mask for each frame by aligning the mask to the mesh on each frame comprises the following steps: making a projection of a mesh to a regular grid to separate the mesh into 100×100 cells by the regular grid; determining the mesh element to which a cell of the grid corresponds to, for each cell; and determining the pixel corresponding to each of the determined mesh elements.

In one or more embodiments, determining the pixel corresponding to each of the determined mesh elements s performed using a breadth-first-search.

In one or more embodiments, making a projection of a mesh to the grid is performed once and steps of determining the mesh element and determining the pixel corresponding to each of the determined mesh elements are performed for each frame.

In one or more embodiments, forming a binary mask providing the pixels to be recolored comprises: dividing the mesh into at least 1600 cells by a grid; scanning each of the frames by a square pixel region, wherein the size of the square pixel region in pixels is determined from the width of an eye in pixels; determining the mean gray-value intensity of each scanned square of the frame; detecting pixels to be recolored by comparing the gray-value intensity of each pixel with the mean value of the square it belongs to and by marking the pixels that have the intensity at least 0.92 times of the mean intensity value as pixels to be recolored; removing a region from the mesh around the pixels to be recolored, wherein the region is a circle having a center on a pixel marked as a pixel to be recolored and a radius as a linear function of the eye width; applying a binary morphological closing to the plurality of marked pixels, wherein the binary morphological closing comprises morphological dilation and morphological erosion applied with a radius determined from the width of eye in pixels; removing small and large regions of the pixels to be recolored from the mesh, wherein the regions with an area less than $R^2*0.2$ are detected as small and the regions with an area more than $R^2*8$ are detected as large, wherein R is radius of binary morphological operations and each region is a four-connected component.

In one or more embodiments, removing small and large regions of the pixels to be recolored is performed using a breadth-first-search.

Additional aspects related to the invention will be set forth in part in the description which follows, and in part will be obvious from the description, or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive technique. Specifically.

DETAILED DESCRIPTION

Figure 1:
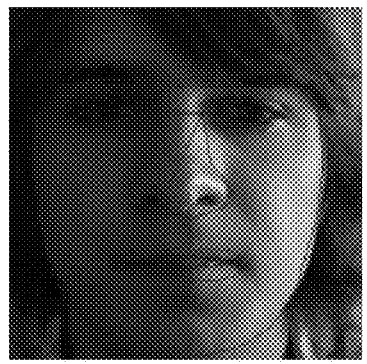
FIG. 1 illustrates facial feature reference points detected by an ASM algorithm used in the method according to one embodiment of the present invention.
Figure 1:
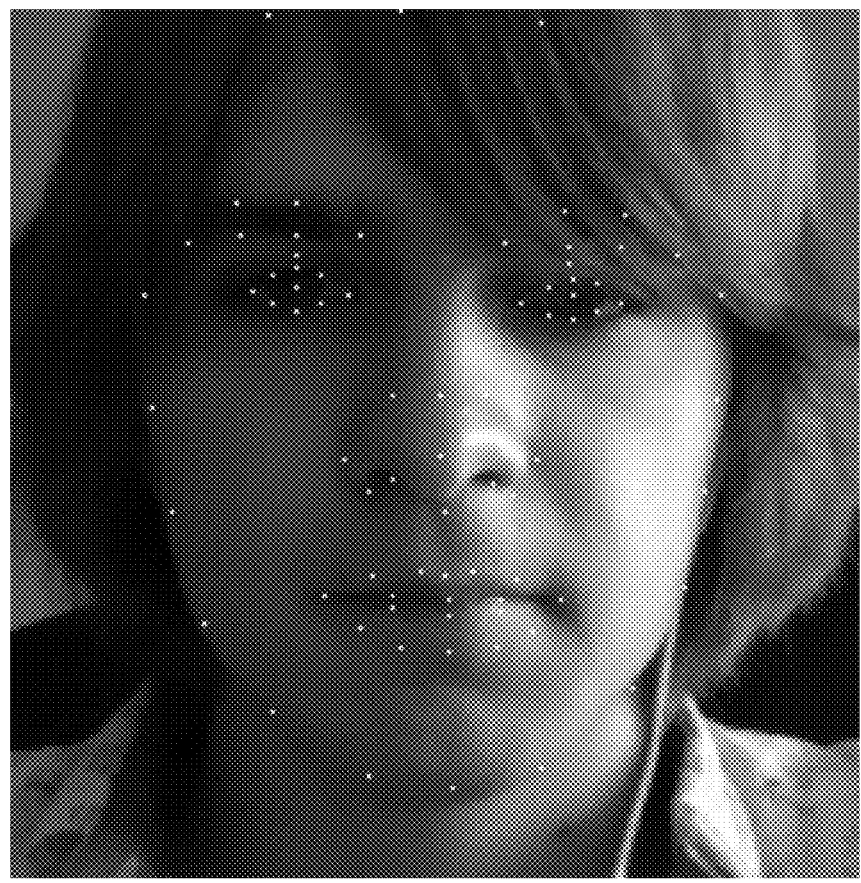

In the following detailed description, reference will be made to the accompanying drawing(s), in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense. Additionally, the various embodiments of the invention as described may be implemented in the form of a software running on a general purpose computer, in the form of a specialized hardware, or combination of software and hardware.

It will be appreciated that the method for real time video processing can be performed with any kind of video data, e.g. video streams, video files saved in a memory of a computerized system of any kind (such as mobile computer devices, desktop computer devices and others), and all other possible types of video data understandable for those skilled in the art. Any kind of video data can be processed, and the embodiments disclosed herein are not intended to be limiting the scope of the present invention by indicating a certain type of video data.

Face Detection and Initialization

The embodiments disclosed further are aimed for processing of video streams, however all other types of video data including video files saved in a memory of a computerized system can be processed by the methods of the present invention. For example, a user can load video files and save them in a memory of his computerized system and such video files can be also processed by the methods of the present invention.

In one or more embodiments, the face is detected on an image using Viola-Jones method well known to persons of ordinary skill in the art. The aforesaid Viola-Jones method is a fast and quite accurate method used to detect the face region. Then, an Active Shape Model (ASM) algorithm is applied to the face region of an image to detect facial feature reference points. However, it should be appreciated that other methods and algorithms suitable for face detection may be used.

In one or more embodiments, facial feature reference point can be acquired using the algorithm described in a publication "Locating Facial Features with an Extended Active Shape Model by Milborrow", S., Nicolls, F. In: Forsyth, D., Torr, P., Zisserman, A. (eds.) ECCV 2008, Part IV. LNCS, vol. 5305, pp. 504-513. Springer, Heidelberg (2008), incorporated herein by reference.

In or more embodiments, mapping can be built from facial feature reference points, detected by ASM, to Candide-3 point, and that gives us Candide-3 points x and y coordinates. Candide is a parameterized face mask specifically developed for model-based coding of human faces. Its low number of polygons (approximately 100) allows fast reconstruction with moderate computing power. Candide is controlled by global and local Action Units (AUs). The global ones correspond to rotations around three axes. The local Action Units control the mimics of the face so that different expressions can be obtained.

The following equation system can be made, knowing Candide-3 points x and y coordinates.

$$\sum_{j=1}^{m} X_{ij} * B_j = x_i, \quad (1)$$

$$\sum_{j=1}^{m} Y_{ij} * B_j = y_i, \quad (2)$$

where $B_j$—j-th shape unit, xi, yi—i-th point coordinates, Xij, Yij—coefficients, which denote how the i-th point coordinates are changed by j-th shape unit. In this case, this system is over-determined, so it can't be solved precisely, so we minimize $$(\sum_{j=1}^{m} X_{ij} * B_j - x_i)^2 + (\sum_{j=1}^{m} Y_{ij} * B_j - y_i)^2 \rightarrow \min. \quad (3)$$

Let's denote $X=((X_{ij})^T,(Y_{ij})^T)^T, x=((x_i)^T,(y_i)^T)^T, B=(B_j)^T.$ (4)

This equation system is linear, therefore its solution is $$B=(X^T X)^{-1} X^T x. \quad (5)$$

In one or more embodiments, it is also possible to use Viola-Jones method and ASM to improve tracking quality. Face tracking methods usually accumulate error over time, so they can lose face position after several hundred frames. In order to prevent it, in the present invention the ASM algorithm is run from time to time to re-initialize tracking algorithm.

Face Tracking

Figure 2:
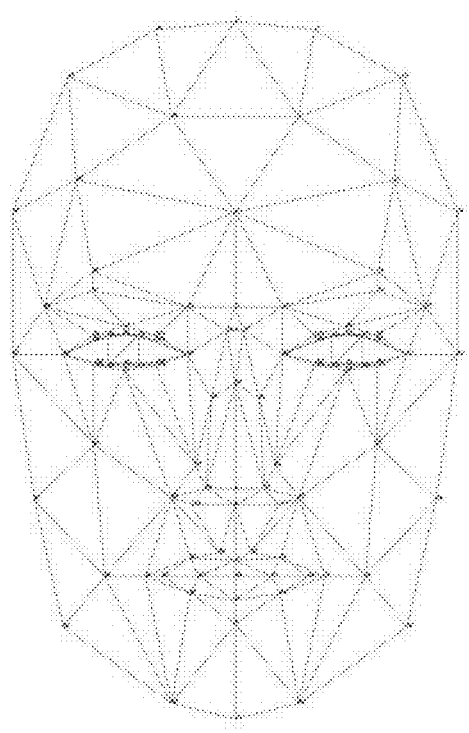
FIG. 2 illustrates Candide-3 model used in the method according to one embodiment of the present invention.

As it was mentioned above, in the present invention Candide-3 model is used (see Ahlberg, J.: Candide-3, an updated parameterized face. Technical report, Linkoping University, Sweden (2001), incorporated herein by reference) to track face during video stream, it is shown in FIG. 2.

In one or more embodiments, a state of the model can be described by shape units intensity vector, action units intensity vector and a position-vector. Shape units are some main parameters of a head and a face, in the present invention the following 10 units are used:

Eyebrows vertical position
Eyes vertical position
Eyes width
Eyes height
Eye separation distance
Nose vertical position
Nose pointing up Mouth vertical position Mouth width Chin width In one or more embodiments, action units are face parameters that correspond to some face movement, in the present invention following 7 units are used:

Upper lip raiser

Jaw drop

Lip stretcher

Left brow lowerer

Right brow lowerer

Lip corner depressor

Outer brow raiser

Figure 3A:
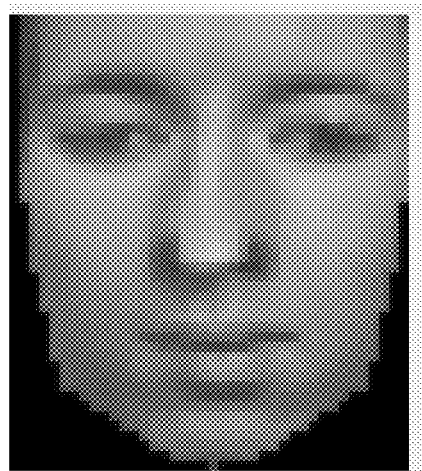
FIG. 3(a) and FIG. 3(b) show an example of a mean face (a) and an example of current observation.
Figure 3B:
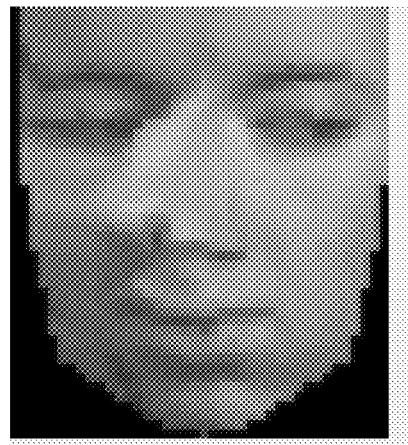
Figure 4:
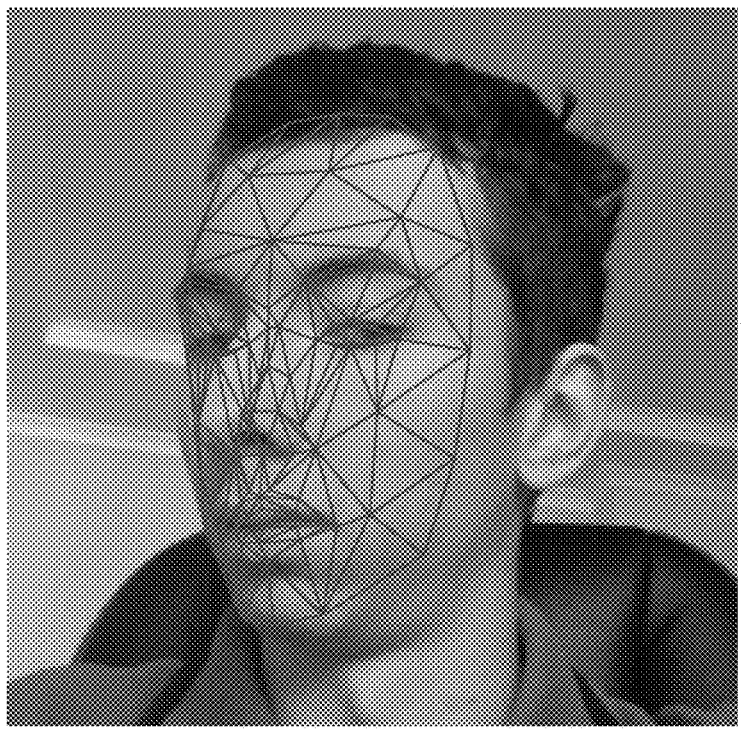
FIG. 4 illustrates Candide at a frame used in the method according to one embodiment of the present invention.

In one or more embodiments, the mask position at a picture can be described using 6 coordinates: yaw, pitch, roll, x, y, scale. The main idea of the algorithm proposed by Dornaika et al. (Dornaika, F., Davoine, F.: On appearance based face and facial action tracking. IEEE Trans. Circuits Syst. Video Technol. 16(9):1107-1124 (2006), incorporated herein by reference) is to find the mask position, which observes the region most likely to be a face. For each position it is possible to calculate the observation error—the value which indicates the difference between image under current mask position and the mean face. An example of the mean face and of the observation under current position is illustrated in FIGS. 3(a)-3(b). FIG. 3(a) corresponds to the observation under the mask shown in FIG. 4.

In one or more embodiments, face is modeled as a picture with a fixed size (width=40 px, height=46 px) called a mean face. Gaussian distribution that is proposed in original algorithms has shown worse result in compare with a static image. So the difference between current observation and a mean face is calculated in the following way:

$$e(b) = \Sigma (\log(1+I_m) - \log(1+I_i))^2 \quad (6)$$

Logarithm function makes tracking more stable.

In one or more embodiments, to minimize error we use Teylor series as it was proposed by Dornaika at. el. (see Dornaika, F., Davoine, F.: On appearance based face and facial action tracking. IEEE Trans. Circuits Syst. Video Technol. 16(9):1107-1124 (2006)). It was found that it is not necessary to sum up a number of finite differences when calculating an approximation to the first derivative. We use $$g_{ij} = \frac{W(y_t, b_t + \delta b_t)_{ij} - W(y_t, b_t - \delta b_t)_{ij}}{\delta_j}$$

to calculate the derivative. Here $g_{ij}$ is an element of matrix G. This matrix has size m*n, where m is large enough (about 1600) and n is small (about 14). If we had calculate ii straightforward we would have to do n*m operations of division. To reduce the number of divisions we can rewrite this matrix as a product of two matrices:

$$G = A*B$$

Where matrix A has the same size as G and its element is:

$$a_{ij} = W(y_t, b_t + \delta b_t)_{ij} - W(y_t, b_t - \delta b_t)_{ij} \quad (7)$$

matrix B is a diagonal matrix with sizes n*n, and $$b_{ii} = \delta_i^{-1} \quad (8)$$

Now we need to obtain Matrix f and here is a place where we can reduce a number of divisions.

$$G_t^+ = (G^T G)^{-1} G^T = (B^T A^T A B)^{-1} B^T A^T = B^{-1} (A^T A)^{-1}$$
$$B^{-1} B A^T = B^{-1} (A^T A)^{-1} A^T \quad (9)$$

In one or more embodiments, after that transformation this can be done with n*n divisions instead of m*n.

One more optimization was used here. If we create matrix $G_t^+$ and then multiply it to $\Delta b_t$, we will have to do $n^2 m$ operations, but if we first multiply $A^T$ and $\Delta b_t$ then $B^{-1}$ $(A^T A)^{-1}$ with it, we will do only $n*m + n^3$ operations, which is much much better because n<<m.

It should be noted that to increase tracking speed in the present invention the multiplication of matrices is performed in such a way, that it can be boosted using ARM advanced SIMD extensions (also known as NEON). Also, the GPU is used instead of CPU whenever possible. To get a high performance of the GPU, operations in the present invention are grouped in a special way.

Thus, tracking according to an embodiment of the present invention has the following distinguishing features:

1. Before tracking Logarithm is applied to grayscale the value of each pixel to track it. This transformation has a great impact to tracking performance.

2. In the procedure of gradient matrix creation, the step of each parameter depends on the scale of the mask.

The following disclosure relates to a particular embodiment of the proposed method. Though the exemplary embodiment is aimed on removing blemishes, the described technique can also be efficiently applied for creating make-up or changing skin tone.

Removing Blemishes

Figure 5A:
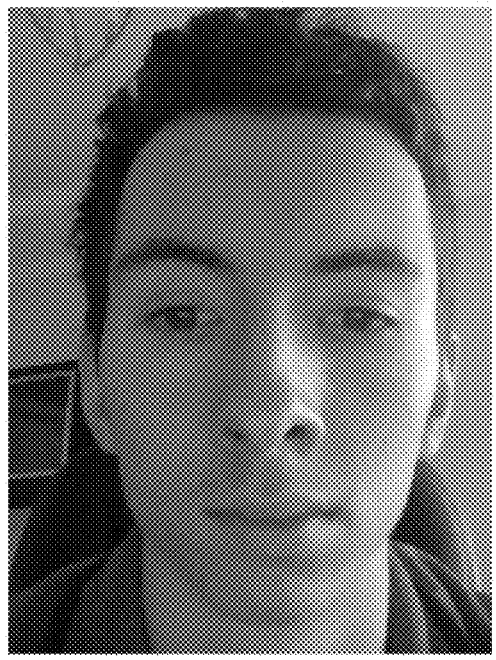
FIG. 5(a) and FIG. 5(b) show a frame before and after blemish removing.
Figure 5B:

In one or more embodiments, blemish removal filter detects blemishes on a face and removes them. FIG. 5(a)-5(b) show the result of applying that filter according to one of the embodiments.

Filter according to one of the embodiments consists of two main parts: blemish region detection and blemish removal. The net model is used to detect blemishes: in one of the embodiments normal Candide-3 projection was separated into 100×100 cells by a regular grid. Each cell contains probability that there is a blemish at the corresponding point at a face. So each cell contains value from 0.0 to 1.0.

In one or more embodiments, each frame updates the blemish model by adding new information. At current frame, blemish region is detected in the following way:

1) Applying Adaptive Binarization.

A frame is scanned using square with sides equal to eye width (in pixel) divided by 2. In each square with central pixel p mean gray-value intensity $m_p$ is calculated. Pixel marked as blemish-pixel if its intensity $I_p$ satisfies the condition:

$$\frac{I_p}{m_p} < 0.93 \quad (10)$$

2) Removing Small Region.

$$R = \frac{\text{eye width} + 13}{14} \quad (11)$$

Breadth-first-search is used to remove all 8-connected components of pixel marked as blemish with a size less than $$R*R*0.3 \quad (12)$$

3) Binary Morphological Closing.

In one or more embodiments, after removing small region, morphological closing is applied to the left image (image with marked pixels) using circle Structure Element with radius equal to R for dilation and radius equal to 0.5*R for erosion.

4) Removing Small and Large Regions.

3. After all steps 1)-3) regions (or so-called connected components, in some embodiments four-connected components) with a size (area) less than R*R*0.2 or greater than R*R*8 are removed using breadth-first-search.

At the end of this process we've got some binary mask, where 1 indicates blemish-pixel. A binary mask is a matrix, where regions with blemishes are filled with 1, and others are filed with 0. In particular embodiments, relating to removing blemishes from a face image on a video the regions are detected using adaptive binarisation of the red channel. Then the model is updated with this mask in the following way: for each cell i, probability that there is a blemish is recalculating using the following formula:

$$p^t_i = (1-\alpha)p^{t-1}_i + \alpha * mask_i \qquad (13)$$

where $p^t_i$—probability of finding a blemish at pixel i after frame number t.
$mask_i$—value of pixel i on the last mask $$\alpha = 1 - \exp(-\log(2.0)/\text{half Life}) \qquad (14)$$

$$\text{half Life} = 20 \qquad (15)$$

Figure 6:
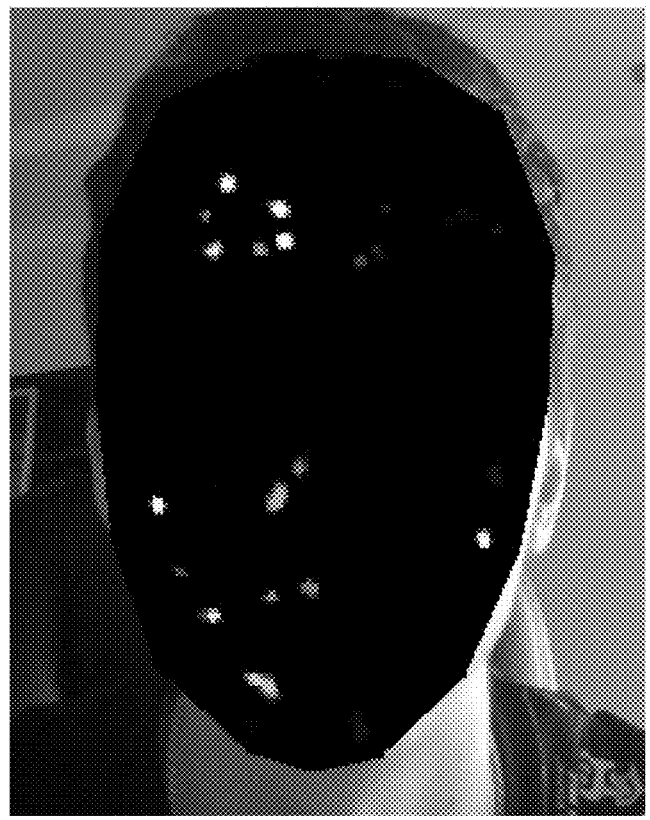
FIG. 6 shows a binary mask that depicts pixels to be recolored.

Visualization of the model can be found in FIG. 6 Light regions that correspond to the high probability of blemish location.

In one or more embodiments, after model updating, blemishes are removed using the following method:

First of all, mapping from each pixel of the face region to cells of the model should be built. To increase performance it is done in the following way:
1) Make an orthogonal project of candide-3 to the 100×100 grid
2) For each cell find a triangle it lies in.
3) Compute barycentric coordinates
4) Find corresponding pixel for each cell in the model
5) Write down the cell coordinates to the found pixel
6) Write down coordinates contains in the nearest found pixel, for each pixel that wasn't found at the step 5. Use breadth-first-search to make it efficiently.

Steps 1-3 may be performed only once, at the initialization part. In other words, only steps 4-6 have to be performed in each frame. So, the pixels to be recolored are detected based on a weighted sum of information about a value of each pixel of the mask from the current frame and information about a value of each pixel of the mask from at least one previous frame: if $I_0$ is intensity of a pixel of a previous mask and $I_1$ is intensity of a current one, that weighted sum here is $I_0 \cdot \alpha + (1-\alpha) \cdot I_1$.

For each pixel at the face region, except pixels that correspond to eyes and mouth locations, its new value is calculated using the following formula:

$$f^t_i = I^t_i * (1 - p^t_i) + r^t_i * p^t_i \qquad (16)$$

where $I^t_i$ is pixel i intensity at frame t,
$r^t_i$ is the mean value of 4 neighbor pixels at the distance dist, dist=1.5*R,
$f^t_i$ is the filtered pixel value.

Exemplary Computer Platform

Figure 7:
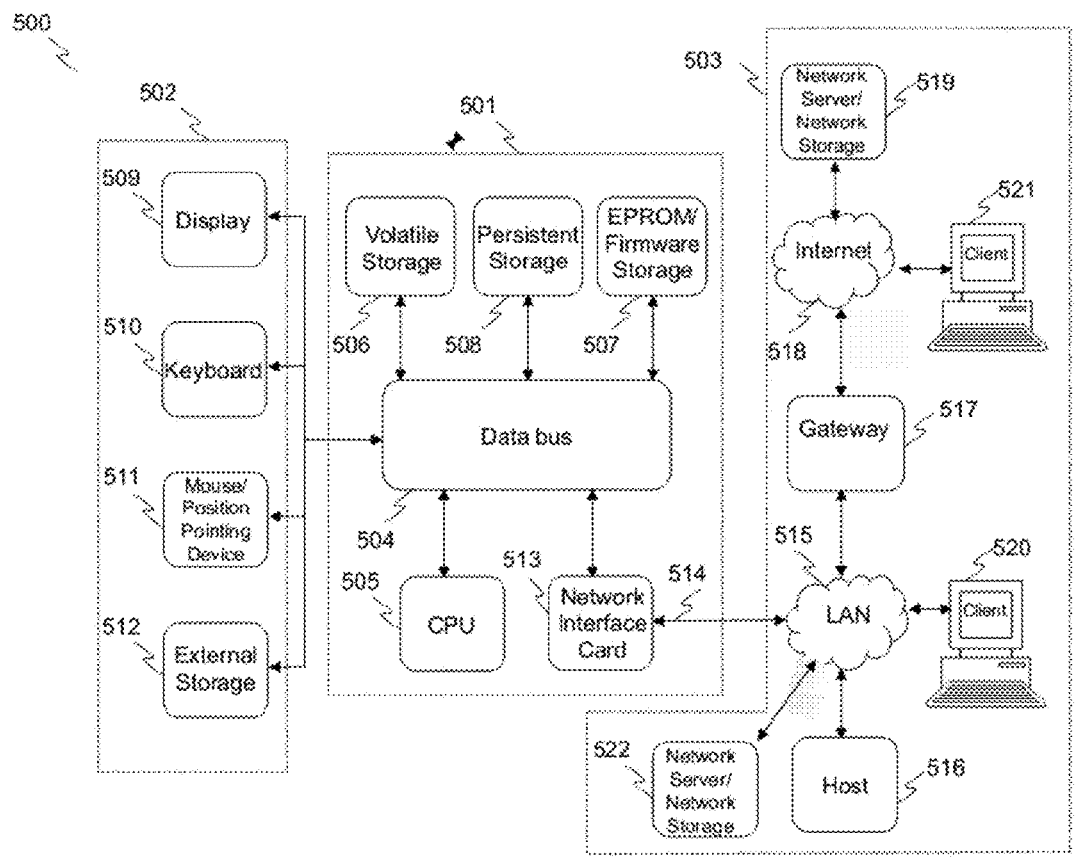
FIG. 7 illustrates an exemplary embodiment of a computer platform based on which the techniques described herein may be implemented.

FIG. 7 is a block diagram that illustrates an embodiment of a computer system 500 upon which various embodiments of the inventive concepts described herein may be implemented. The system 500 includes a computer platform 501, peripheral devices 502 and network resources 503.

The computer platform 501 may include a data bus 504 or other communication mechanism for communicating information across and among various parts of the computer platform 501, and a processor 505 coupled with bus 504 for processing information and performing other computational and control tasks. Computer platform 501 also includes a volatile storage 506, such as a random access memory (RAM) or other dynamic storage device, coupled to bus 504 for storing various information as well as instructions to be executed by processor 505, including the software application for implementing multifunctional interaction with elements of a list using touch-sensitive devices described above. The volatile storage 506 also may be used for storing temporary variables or other intermediate information during execution of instructions by processor 505. Computer platform 501 may further include a read only memory (ROM or EPROM) 507 or other static storage device coupled to bus 504 for storing static information and instructions for processor 505, such as basic input-output system (BIOS), as well as various system configuration parameters. A persistent storage device 508, such as a magnetic disk, optical disk, or solid-state flash memory device is provided and coupled to bus 504 for storing information and instructions.

Computer platform 501 may be coupled via bus 504 to a touch-sensitive display 509, such as a cathode ray tube (CRT), plasma display, or a liquid crystal display (LCD), for displaying information to a system administrator or user of the computer platform 501. An input device 510, including alphanumeric and other keys, is coupled to bus 504 for communicating information and command selections to processor 505. Another type of user input device is cursor control device 511, such as a mouse, a trackball, or cursor direction keys for communicating direction information and command selections to processor 505 and for controlling cursor movement on touch-sensitive display 509. This input device typically has two degrees of freedom in two axes, a first axis (e.g., x) and a second axis (e.g., y), that allows the device to specify positions in a plane. To detect user's gestures, the display 509 may incorporate a touchscreen interface configured to detect user's tactile events and send information on the detected events to the processor 505 via the bus 504.

An external storage device 512 may be coupled to the computer platform 501 via bus 504 to provide an extra or removable storage capacity for the computer platform 501. In an embodiment of the computer system 500, the external removable storage device 512 may be used to facilitate exchange of data with other computer systems.

The invention is related to the use of computer system 500 for implementing the techniques described herein. In an embodiment, the inventive system may reside on a machine such as computer platform 501. According to one embodiment of the invention, the techniques described herein are performed by computer system 500 in response to processor 505 executing one or more sequences of one or more instructions contained in the volatile memory 506. Such instructions may be read into volatile memory 506 from another computer-readable medium, such as persistent storage device 508. Execution of the sequences of instructions contained in the volatile memory 506 causes processor 505 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 505 for execution. The computer-readable medium is just one example of a machine-readable medium, which may carry instructions for implementing any of the methods and/or techniques described herein. Such a medium may take many forms, including but not limited to, non-volatile media and volatile media. Non-volatile media includes, for example, optical or magnetic disks, such as the persistent storage device 508. Volatile media includes dynamic memory, such as volatile storage 506.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, an EPROM, a FLASH-EPROM, a flash drive, a memory card, any other memory chip or cartridge, or any other medium from which a computer can read.

Various forms of computer readable media may be involved in carrying one or more sequences of one or more instructions to processor 505 for execution. For example, the instructions may initially be carried on a magnetic disk from a remote computer. Alternatively, a remote computer can load the instructions into its dynamic memory and send the instructions over a telephone line using a modem. A modem local to computer system can receive the data on the telephone line and use an infra-red transmitter to convert the data to an infra-red signal. An infra-red detector can receive the data carried in the infra-red signal and appropriate circuitry can place the data on the data bus 504. The bus 504 carries the data to the volatile storage 506, from which processor 505 retrieves and executes the instructions. The instructions received by the volatile memory 506 may optionally be stored on persistent storage device 508 either before or after execution by processor 505. The instructions may also be downloaded into the computer platform 501 via Internet using a variety of network data communication protocols well known in the art.

The computer platform 501 also includes a communication interface, such as network interface card 513 coupled to the data bus 504. Communication interface 513 provides a two-way data communication coupling to a network link 514 that is coupled to a local network 515. For example, communication interface 513 may be an integrated services digital network (ISDN) card or a modem to provide a data communication connection to a corresponding type of telephone line. As another example, communication interface 513 may be a local area network interface card (LAN NIC) to provide a data communication connection to a compatible LAN. Wireless links, such as well-known 802.11a, 802.11b, 802.11g and Bluetooth may also used for network implementation. In any such implementation, communication interface 513 sends and receives electrical, electromagnetic or optical signals that carry digital data streams representing various types of information.

Network link 514 typically provides data communication through one or more networks to other network resources. For example, network link 514 may provide a connection through local network 515 to a host computer 516, or a network storage/server 522. Additionally or alternatively, the network link 514 may connect through gateway/firewall 517 to the wide-area or global network 518, such as an Internet. Thus, the computer platform 501 can access network resources located anywhere on the Internet 518, such as a remote network storage/server 519. On the other hand, the computer platform 501 may also be accessed by clients located anywhere on the local area network 515 and/or the Internet 518. The network clients 520 and 521 may themselves be implemented based on the computer platform similar to the platform 501.

Local network 515 and the Internet 518 both use electrical, electromagnetic or optical signals that carry digital data streams. The signals through the various networks and the signals on network link 514 and through communication interface 513, which carry the digital data to and from computer platform 501, are exemplary forms of carrier waves transporting the information.

Computer platform 501 can send messages and receive data, including program code, through the variety of network(s) including Internet 518 and LAN 515, network link 515 and communication interface 513. In the Internet example, when the system 501 acts as a network server, it might transmit a requested code or data for an application program running on client(s) 520 and/or 521 through the Internet 518, gateway/firewall 517, local area network 515 and communication interface 513. Similarly, it may receive code from other network resources.

The received code may be executed by processor 505 as it is received, and/or stored in persistent or volatile storage devices 508 and 506, respectively, or other non-volatile storage for later execution.

Finally, it should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The present invention has been described in relation to particular examples, which are intended in all respects to be illustrative rather than restrictive. Those skilled in the art will appreciate that many different combinations of hardware, software, and firmware will be suitable for practicing the present invention. For example, the described software may be implemented in a wide variety of programming or scripting languages, such as Assembler, C/C++, Objective-C, perl, shell, PHP, Java, as well as any now known or later developed programming or scripting language.

Moreover, other implementations of the invention will be apparent to those skilled in the art from consideration of the specification and practice of the invention disclosed herein. Various aspects and/or components of the described embodiments may be used singly or in any combination in the systems and methods for real time video processing. It is intended that the specification and examples be considered as exemplary only, with a true scope and spirit of the invention being indicated by the following claims.

What is claimed is:

1. A computer-implemented method of real time processing of a video for changing color of an object on a face in the video, the method being performed in connection with a computerized system comprising a processing unit and a memory, the method comprising:
   forming a mesh of the face in the video based on distinguishable points present in most frames of the video;
   aligning the mesh to the face image in each frame;
   forming a binary mask providing the pixels to be recolored based on a weighted sum of information from the current frame and information from at least one previous frame;
   aligning the binary mask to the mesh on each frame; and
   applying a new colour and a new intensity value to the pixels of each frame that are to be recolored.

2. The computer-implemented method of claim 1, wherein the new colour is applied without full intensity so that the colour is partly opaque.

3. The computer-implemented method of claim 1, wherein the new colour and intensity value for the pixels of each frame that are to be recolored are calculated using color and intensity values of a neighbor pixel.

4. The computer-implemented method of claim 1, wherein aligning the binary mask to the mesh on each frame comprises:
  making a projection of a mesh to a regular grid to separate the mesh into 100×100 cells by the regular grid;
  determining the mesh element to which a cell of the grid corresponds to, for each cell; and
  determining the pixel corresponding to each of the determined mesh elements.

5. The computer-implemented method of claim 4, wherein determining the pixel corresponding to each of the determined mesh elements is performed using a breadth-first-search.

6. The computer-implemented method of claim 4, wherein making a projection of a mesh to the grid is performed once and steps of determining the mesh element and determining the pixel corresponding to each of the determined mesh elements are performed for each frame.

7. The computer-implemented method of claim 1, wherein forming a binary mask providing the pixels to be recolored comprises:
  dividing the mesh into at least 1600 cells by a grid;
  scanning each frame by a square pixel region, wherein the size of the square pixel region in pixels is determined from the width of an eye in pixels;
  determining the mean gray-value intensity of each scanned square of the frame;
  detecting pixels to be recolored by comparing the gray-value intensity of each pixel with the mean value of the square it belongs to and by marking the pixels that have the intensity at least 0.92 times of the mean intensity value as pixels to be recolored;
  removing a region from the mesh around the pixels to be recolored, wherein the region is a circle having a center on a pixel marked as a pixel to be recolored and a radius as a linear function of the eye width;
  applying binary morphological closing to the plurality of marked pixels, wherein the binary morphological closing comprises morphological dilation and morphological erosion applied with a radius determined from the width of eye in pixels; and
  removing small and large regions of the pixels to be recolored from the mesh, wherein the regions with an area less than $R^2*0.2$ are detected as small and the regions with an area more than $R^2*8$ are detected as large, wherein R is the radius of binary morphological operations and each region is a four-connected component.

8. The computer-implemented method of claim 7, wherein removing small and large regions of the pixels to be recolored is performed using a breadth-first-search.

9. A mobile computerized system comprising a processing unit and a memory, the memory storing instructions for:
  forming a mesh of the face in a video based on distinguishable points present in most frames of the video;
  aligning the mesh to the face image in each frame;
  forming a binary mask providing the pixels to be recolored based on a weighted sum of information from the current frame and information from at least one previous frame;
  aligning the binary mask to the mesh on each frame; and
  applying a new colour and a new intensity value to the pixels of each frame that are to be recolored.

10. The mobile computerized system of claim 9, wherein the new colour is applied without full intensity so that the colour is partly opaque.

11. The mobile computerized system of claim 9, wherein the new colour and intensity value for the pixels of each frame that are to be recolored are calculated using color and intensity values of the neighbor pixel.

12. The mobile computerized system of claim 9, wherein forming a mask for each frame by aligning the mask to the mesh on each frame comprises the following steps:
  making a projection of a mesh to a regular grid to separate the mesh into 100×100 cells by the regular grid;
  determining the mesh element to which a cell of the grid corresponds to, for each cell; and
  determining the pixel corresponding to each of the determined mesh elements.

13. The mobile computerized system of claim 12, wherein determining the pixel corresponding to each of the determined mesh elements s performed using a breadth-first-search.

14. The mobile computerized system of claim 12, wherein making a projection of a mesh to the grid is performed once and steps of determining the mesh element and determining the pixel corresponding to each of the determined mesh elements are performed for each frame.

15. The mobile computerized system of claim 9, wherein forming a binary mask providing the pixels to be recolored comprises:
  dividing the mesh into at least 1600 cells by a grid;
  scanning each of the frames by a square pixel region, wherein the size of the square pixel region in pixels is determined from the width of an eye in pixels;
  determining the mean gray-value intensity of each scanned square of the frame;
  detecting pixels to be recolored by comparing the gray-value intensity of each pixel with the mean value of the square it belongs to and by marking the pixels that have the intensity at least 0.92 times of the mean intensity value as pixels to be recolored;
  removing a region from the mesh around the pixels to be recolored, wherein the region is a circle having a center on a pixel marked as a pixel to be recolored and a radius as a linear function of the eye width;
  applying a binary morphological closing to the plurality of marked pixels, wherein the binary morphological closing comprises morphological dilation and morphological erosion applied with a radius determined from the width of eye in pixels;
  removing small and large regions of the pixels to be recolored from the mesh, wherein the regions with an area less than $R^2*0.2$ are detected as small and the regions with an area more than $R^2*8$ are detected as large, wherein R is radius of binary morphological operations and each region is a four-connected component.

16. The mobile computerized system of claim 15, wherein removing small and large regions of the pixels to be recolored is performed using a breadth-first-search.

17. A device capable of video processing comprising a processing unit and a memory, the memory storing instructions for:
  forming a mesh of the face in a video based on distinguishable points present in most frames of the video;
  aligning the mesh to the face image in each frame;

forming a binary mask providing the pixels to be recolored based on a weighted sum of information from the current frame and information from at least one previous frame;
aligning the binary mask to the mesh on each frame; and
applying a new colour and a new intensity value to the pixels of each frame that are to be recolored.

18. The mobile computerized system of claim 17, wherein the new colour is applied without net-full intensity so that the colour is partly opaque.

19. The mobile computerized system of claim 17, wherein the new colour and intensity value for the pixels of each frame that are to be recolored are calculated using color and intensity values of the neighbor pixel.

20. The mobile computerized system of claim 17, wherein forming a mask for each frame by aligning the mask to the mesh on each frame comprises the following steps:
making a projection of a mesh to a regular grid to separate the mesh into 100×100 cells by the regular grid;
determining the mesh element to which a cell of the grid corresponds to, for each cell; and
determining the pixel corresponding to each of the determined mesh elements.

21. The mobile computerized system of claim 20, wherein determining the pixel corresponding to each of the determined mesh elements s performed using a breadth-first-search.

22. The mobile computerized system of claim 20, wherein making a projection of a mesh to the grid is performed once and steps of determining the mesh element and determining the pixel corresponding to each of the determined mesh elements are performed for each frame.

23. The mobile computerized system of claim 17, wherein forming a binary mask providing the pixels to be recolored comprises:
dividing the mesh into at least 1600 cells by a grid;
scanning each of the frames by a square pixel region, wherein the size of the square pixel region in pixels is determined from the width of an eye in pixels;
determining the mean gray-value intensity of each scanned square of the frame;
detecting pixels to be recolored by comparing the gray-value intensity of each pixel with the mean value of the square it belongs to and by marking the pixels that have the intensity at least 0.92 times of the mean intensity value as pixels to be recolored;
removing a region from the mesh around the pixels to be recolored, wherein the region is a circle having a center on a pixel marked as a pixel to be recolored and a radius as a linear function of the eye width;
applying a binary morphological closing to the plurality of marked pixels, wherein the binary morphological closing comprises morphological dilation and morphological erosion applied with a radius determined from the width of eye in pixels;
removing small and large regions of the pixels to be recolored from the mesh, wherein the regions with an area less than $R^2*0.2$ are detected as small and the regions with an area more than $R^2*8$ are detected as large, wherein R is radius of binary morphological operations and each region is a four-connected component.

24. The mobile computerized system of claim 23, wherein removing small and large regions of the pixels to be recolored is performed using a breadth-first-search.

* * * * *